United States Patent
Salter et al.

(10) Patent No.: US 12,192,709 B2
(45) Date of Patent: Jan. 7, 2025

(54) ADAPTIVE MOBILE ONSITE LOUDSPEAKER SYSTEM

(71) Applicant: FORD GLOBAL TECHNOLOGIES, LLC, Dearborn, MI (US)

(72) Inventors: Stuart C. Salter, White Lake, MI (US); Brendan F. Diamond, Grosse Pointe, MI (US); Pietro Buttolo, Dearborn Heights, MI (US); Meghan Preiss, Detroit, MI (US); Adam Wint, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 17/980,649

(22) Filed: Nov. 4, 2022

(65) Prior Publication Data
US 2024/0155300 A1    May 9, 2024

(51) Int. Cl.
*H04R 27/00*    (2006.01)
*B60Q 5/00*    (2006.01)

(52) U.S. Cl.
CPC .............. *H04R 27/00* (2013.01); *B60Q 5/00* (2013.01); *H04R 2430/01* (2013.01); *H04R 2499/13* (2013.01)

(58) Field of Classification Search
CPC ...... B60K 35/265; B60K 35/26; B60K 35/20; B60K 35/00; B60Q 5/00; B60Q 1/549; H04R 27/00; H04R 2499/13; H04R 2430/01

See application file for complete search history.

(56) References Cited

U.S. PATENT DOCUMENTS 9,269,255 B2  2/2016  Beaulieu et al.
9,855,890 B2  1/2018  James et al.

FOREIGN PATENT DOCUMENTS

CN  203416399 U    1/2014
DE  102019134442 A1  6/2021
DE  102017208025 B4  8/2021

*Primary Examiner* — Kile O Blair
(74) *Attorney, Agent, or Firm* — Joseph Zane; .Brooks Kushman. P. C.

(57) ABSTRACT

A vehicle receives a message for audible output and designation of a specified recipient. The vehicle uses one or more vehicle sensors to detect a location of the specified recipient. Further, the vehicle determines an audible output level projected to be sufficient for the recipient to hear the message at the location, responsive to detecting the location and outputs the message through speakers of the vehicle at the determined audible output level.

20 Claims, 3 Drawing Sheets

ADAPTIVE MOBILE ONSITE LOUDSPEAKER SYSTEM

TECHNICAL FIELD

The illustrative embodiments generally relate to methods and apparatuses adaptive mobile onsite loudspeaker system.

BACKGROUND

Construction sites, especially commercial constructions sites, are busy, hectic, loud environments where dozens of workers may be engaged in varied tasks spread out across a wide foot print. These workers can be clustered, separated, above grade, below grade, inside, outside, etc. They may be running loud equipment, driving heavy machinery and intensely focused on the tasks at hand.

Conventionally, the common way to contact a given worker at a site was to use a loudspeaker system deployed either throughout the site, or a very loud loudspeaker system deployed at a central location. Lacking directionality and any real sense of where the relevant parties were located, these systems tend to create excessive ambient noise, and often do not deliver the message to an intended recipient in any event.

On the other hand, using modern portable devices such as cell phones for communication may not be successful, because such devices tend to have lower volumes and can often go unnoticed, even if ringing and vibrating, in the bustle and noise of an active construction site. Walkie talkies are another alternative, but they tend to be bulkier, and they still need to be in the hands of the relevant personnel in order to deliver a message, unless everyone onsite has a walkie talkie—which can be prohibitive for a number of reasons.

For these reasons, loudspeakers are not an unreasonable approach, except that they still tend to lack directionality, knowledge of worker locations, and require installation and removal when work is complete or moves to another location.

SUMMARY

In a first illustrative embodiment, a system includes one or more processors configured to receive a message for delivery to one or more specified personnel. The one or more processors are also configured to determine one or more onsite vehicles to deliver the message audibly. Further, the one or more processors are configured to send the message and personnel identification of the specified personnel to the one or more onsite vehicles and instruct the one or more onsite vehicles to deliver the message upon detection of at least one of the specified personnel.

In a second illustrative embodiment, a vehicle includes one or more processors configured to receive a message for audible output and designation of a specified recipient. The one or more processors are also configured to use one or more vehicle sensors to detect a location of the specified recipient. Further, the one or more processors are configured to determine an audible output level projected to be sufficient for the recipient to hear the message at the location, responsive to detecting the location and output the message through speakers of the vehicle at the determined audible output level.

In a third illustrative embodiment, a vehicle includes one or more processors configured to receive a message for audible output and designation of a specified recipient. The one or more processors are also configured to use one or more vehicle sensors to detect a location of the specified recipient. The one or more processors are additionally configured to determine whether an audible output from speakers of the vehicle will be sufficient for the recipient to hear the message at the location and, responsive to the audible output being insufficient, take at least one vehicle action, based on a determined basis for the audible output being insufficient, to mitigate the insufficiency of the audible output.

DETAILED DESCRIPTION

Figure 1:
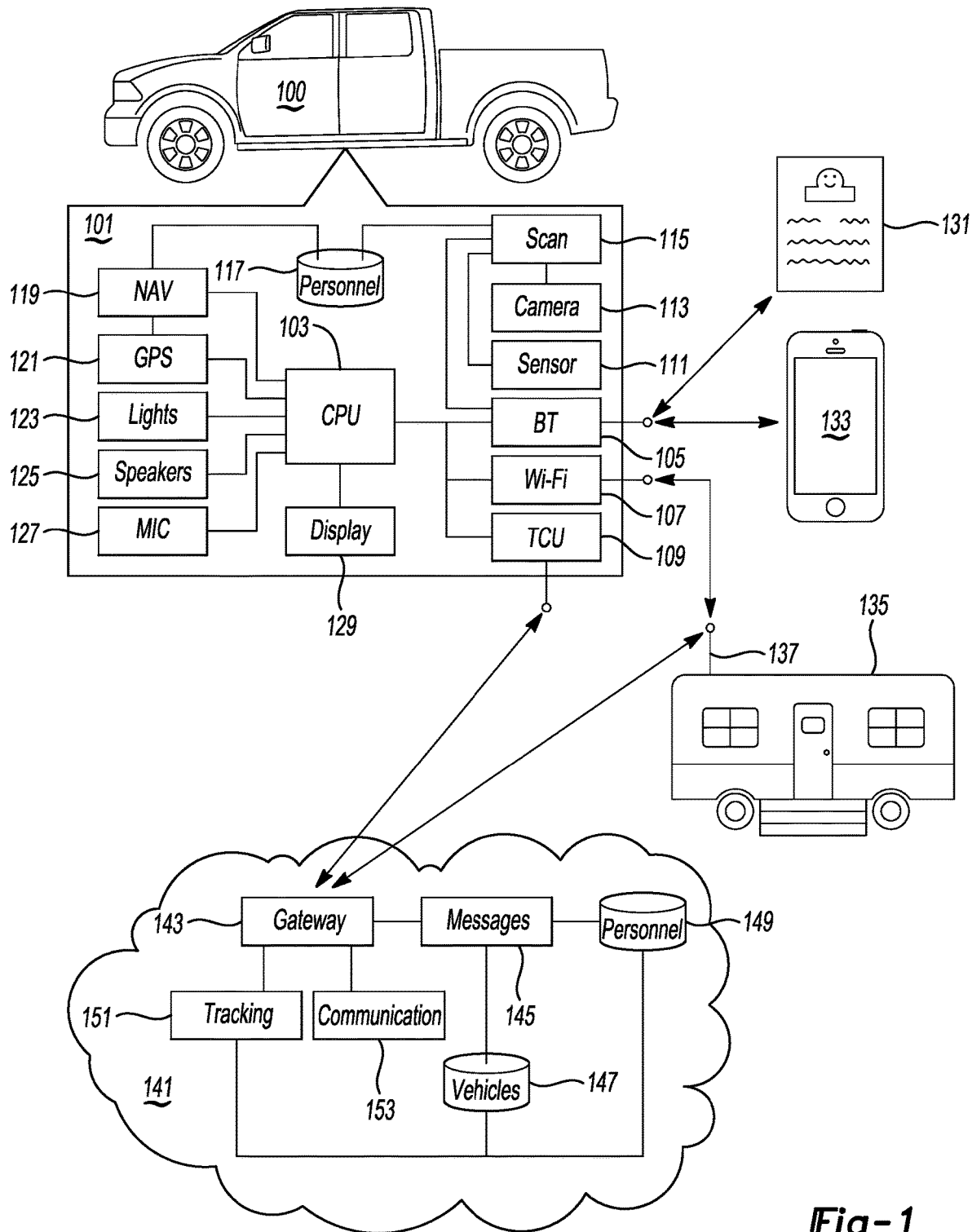
FIG. 1 shows an illustrative example of a vehicle loudspeaker system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose the use of autonomous on-site vehicles with external audio systems or loud internal audio systems to create a mobile, dynamic on-site message delivery system. Such a system can travel, control directionality of sound, find relevant parties, select speakers for delivery to relevant parties, and reach multiple, disparate parties through the use of multiple vehicles.

Vehicles often sit idle at sites during most of the work day, but modern vehicles are powerful computing engines with multi-media and communication capabilities, and they can further be equipped to move themselves, autonomously, around a site as needed. This allows them to "work" in the same manner as an employee, fulfilling tasks that are suited to such vehicles, which, in this instance, includes message couriering.

Vehicles can be provided with 360 degree directional speakers, or can re-orient themselves to aim relevant speakers at relevant parties. They may have the sound projection power to send loud audio messages in intended directions, and may include the sensing capability to determine whether the relevant parties are in audible proximity and where those parties are located relative to the vehicle.

Vehicles can also determine the levels of ambient noise present and dynamically adapt sound to accommodate the noise without excessively adding to it. They can work in concert to deliver messages around a site simultaneously, they can serve as communication points for message responses and additional data displayed on vehicle displays. When a job, or even a day, is over, the vehicles can simply travel to another site where they are needed, without any crew needed to break down or setup equipment.

FIG. 1 shows an illustrative example of a vehicle loudspeaker system. Vehicle 100 represents a vehicle of which one or more may be present at a site or may be re-tasked to a site. One advantage of vehicles is their mobility, they can be moved where the personnel are located. For example, if a site has 50 people involved in a building process, several vehicles can be onsite. If the number of onsite personnel falls to several skilled trades at certain points, and the builders move to another site, the relevant number of vehicles can move with them. These vehicles can even be the literal vehicles those employees drive to work, meaning that the number of usable onsite vehicles can roughly change with the number of personnel who used those vehicles as transportation, creating almost a natural occurrence of a reasonable number of vehicles usable for secondary tasks.

Such vehicles may require specialized or advanced equipment to serve in certain roles, but in other instances virtually any vehicle with a minimum capability set may be used in at least some tasks. Companies can provide the vehicles if desired, or employees may be paid for use of their vehicles while onsite. In these examples, the vehicle will act in certain autonomous or semi-autonomous roles, and so a given vehicle filling a given role, as described, would need the capability to serve in the manner proposed.

It is worth noting that vehicles not need to be autonomous to fill some roles, but if they cannot self-drive then they may not be able to, for example, drive around a site to locate personnel, unless they have a driver who they are guiding to the relevant locations. Similarly, one vehicle with 360 degree exterior sound may approach a solution of directional noise projection differently from a vehicle with only forward-facing external loudspeakers—the former may simply select certain speakers, the latter may have to re-orient to send sound in the correct direction. Nonetheless, it will be appreciated that many vehicles can serve some or all of the roles described herein, and changes to the embodiments based on vehicle equipment and configuration, to achieve the results described, are contemplated within the scope of the invention.

In this example, the vehicle 100 is capable of at least limited self-driving to negotiate and maneuver around a construction site. The vehicle can further re-orient itself as needed, to position outputs in a controlled manner in a desired direction.

The vehicle 100 includes a computing system 101, which has one or more processors 103. The computing system 101 may also include, for example, a number of communication capabilities and transceivers, receivers, transmitters, etc. In this example, that includes a BLUETOOTH transceiver 105. The BLUETOOTH transceiver can be used for local device communication and detection. In this example, that can include detection of BLUETOOTH low energy (BLE) tags 131 provided to employees onsite, as well as detection of mobile devices 133 that are associated with certain personnel. This concept, as described later herein, can be used by a given vehicle 100 to determine if it is in audible proximity to a given employee and can determine a relative directionality of the employee relative to locations of speakers on the vehicle 100.

A Wi-Fi transceiver 107 can be used to communicate around site on deployed access points, and may include connection to one or more central office structures 135. If such a network is available, which can include a mesh or ad-hoc wireless network created by onsite vehicles, a manager in a central office 135 can issue paging instructions for various personnel and the network can relay those instructions to some or all vehicles onsite.

A telematics control unit (TCU) 109 can further send communication to and from a cloud 141, which is another possible relay between the office 135 Wi-Fi 137 and vehicles 100 that may not be reachable over an onsite Wi-Fi network. The TCU can include one or more cellular modems and active cellular plans, and can allow vehicles 100 to be reached anywhere there is an active and available cellular signal. This communication can also be used to summon one or more vehicles 100 from another site, if they are needed on a given site but are not presently located onsite.

The vehicle 100 may also include one or more sensors 111 usable to determine information about onsite conditions (objects, personnel, etc). This can include RADAR or LIDAR, usable to determine personnel locations relative to a vehicle if the personnel lack radio frequency identification. A camera 113 can also be used for such purposes, and images from a camera may also indicate whether personnel are using ear protection and/or whether personnel are operating equipment, such as a jackhammer, that may render virtually any output sound inaudible. Such considerations can also be used to delay audio output until moments when certain of those loud devices are not being actively utilized.

A scanning process can use the sensors and communication transceivers to determine the locations and presences (or lack thereof) of onsite personnel in proximity to the vehicle 100. A personnel database can include identification of the personnel and any relevant radio signatures or other detectable features (facial recognition, etc) usable to determine if an intended message recipient is in proximity to a vehicle 100. For example, a paging request for Don Johnson can result in a lookup of the badge radio ID, a mobile device radio ID and one or more images usable to recognize Don using vehicle sensors. The vehicle can then scan for the relevant radio ID signatures and/or use vehicle cameras to more precisely locate Don if multiple personnel are present and the radio signatures simply indicate that Don is approximately 50 feet west of the vehicle. The camera may indicate that Don is engaged in using a concrete saw and may provide feedback indicating when Don stops using the saw so that a message can be delivered.

A navigation process 119 can be used to navigate a vehicle to a location associated with an intended recipient, working in conjunction with a GPS receiver 121 or other coordinate system. The personnel database 117 may include updates about the location of the personnel onsite, based either on, for example, a location of last-detection or an area where the person is tasked with working for a present task. Scanning by a vehicle for an intended recipient can also produce the locations of numerous other personnel, and those locations can be used to update relevant records in the personnel database to maintain knowledge of where various personnel are located so that messages can be successfully delivered and the appropriate vehicles 100 can be tasked with delivery based on their own present locations. The vehicle 100 can also convey personnel locations into the cloud 141 to a personnel database 149 for access by other vehicles that may need the information but which may not have direct access to the vehicle 100 detecting the person on a prior scan. The remote database can send updates to various onsite vehicles at a given site whenever it is updated with local data—e.g., if there are five vehicles onsite, and one detects Don Johnson, the updated information can be distributed to the other vehicles in case the currently-proximate vehicle is engaged in a different task and cannot be utilized to deliver a message to Don when requested.

Vehicles 100 may also include a variety of external outputs, which may include headlamps 123, speakers 125 and even specialized internal or external displays 129 if desired. Lights 123 can also include interior lighting and speakers may include interior speakers. Even if a vehicle is not provided with external speakers, it can orient sound by, for example, increasing internal volume and selectively lowering windows to direct sound in a given exitance from the vehicle 100. Internal and external lighting can be used under correct conditions to signal that a message may need to be delivered, which may be useful when ambient noise is high enough that audible messages may be virtually impossible to deliver. Variances in color and sequence of lighting can be used to convey urgency and/or intended recipients—for example, a green interior cabin could indicate a general message, a blue cabin could indicate a message intended for a site supervisor. Since sound does not interfere with light, lighting can at least be used as a signaling device to encourage message reception by decreasing ambient noise (or entering a vehicle) when possible.

A backend cloud system 141 can be used for locating vehicles, updating personnel locations, message conveyance, two-way communication, etc. A backend provided by an original equipment manufacturer (OEM) may include a variety of functionality and a gateway process 143 may route requests and responses accordingly. In this example, as noted above, the backend may include an updateable set of personnel locations, as well as a set of vehicle 100 locations 147 and any tasks in which those vehicles may be currently engaged. This data can be used to select a vehicle 100 for message delivery. For example, a site manager may need to convey a message to workers 200 feet from a trailer 135, but the closest vehicle may be engaged in another task. If that vehicle actively scans or previously scanned the locations of nearby personnel, another unused vehicle can be selected from the list of site locations 147 to drive over to the personnel and deliver the message. A messaging process 145 can determine which vehicles 100 should be used for which message conveyance, and whether multiple vehicles should or can be used. A tracking process 151 can be used to update personnel and vehicle locations as they are reported, so that the messaging process knows where relevant personnel and vehicles are located. The cloud may also provide two-way (or more way) communication between various entities that may be requested to respond to messaging—for example, a message can ask for identification of unused metal studs at any location, and each location manager can respond with the availability, if any, of such material.

Figure 2:
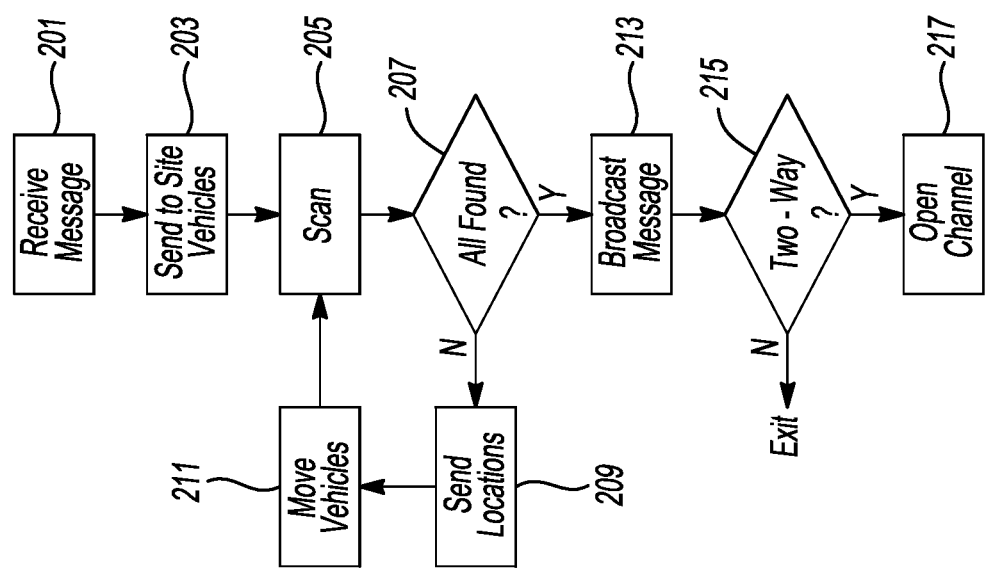
FIG. 2 shows an illustrative example of a message delivery process.

FIG. 2 shows an illustrative example of a message delivery process. In this example, a management process can receive a message at 201. This can be a process executing at a site computer or in the cloud. The process may actively select vehicles for reception of the message, based on intended recipients and their respective locations, or may simply send the message to all vehicles onsite at 203—allowing those vehicles to determine their own suitability for message delivery based on proximity of intended recipients.

In this example, each vehicle receiving the message delivery instructions scans for proximate personnel at 205. This can include, for example, scanning for radio ID signatures, mobile device signatures for mobile devices known to be possessed by recipients, using cameras to search for recognizable faces, etc. If all personnel are not found at 207, the messaging process can deliver a set of known personnel locations or projected personnel locations for missing personnel at 209 to select vehicles, which can be instructed to move to those site locations at 211.

Vehicles finding personnel recipients can report those locations and the locations of those vehicles. It may not always make sense to move the closest vehicle to a personnel location, since that closest vehicle may be within earshot of other personnel recipients, so the messaging process can choose an appropriate vehicle (e.g., a vehicle with no proximate recipients) to send to the projected locations of the personnel not discovered through the scanning. In other instances, there may only be one vehicle available for message delivery, and so the message may have to be delivered serially, to one group at a time.

Once all (or a suitable threshold) number of recipients are found at 207, the vehicle(s) can broadcast the message through external speakers when appropriate at 213. This can include, for example, selection of speakers oriented towards intended recipients, re-orientation of the vehicle to place speakers in position, control of volume levels to accommodate ambient noise, etc.

If a message requests or requires a response at 215, the process can open a communication channel at 217. This can include use of an external microphone when ambient noise is low, or an internal communication system inside the vehicle when ambient noise is excessive. The vehicle can also append instructions to a message as needed—for example, a message can be "Don Johnson please contact the personnel office," and the vehicle may append "please step inside the vehicle and close the door to respond" when ambient noise is excessive.

Figure 3:
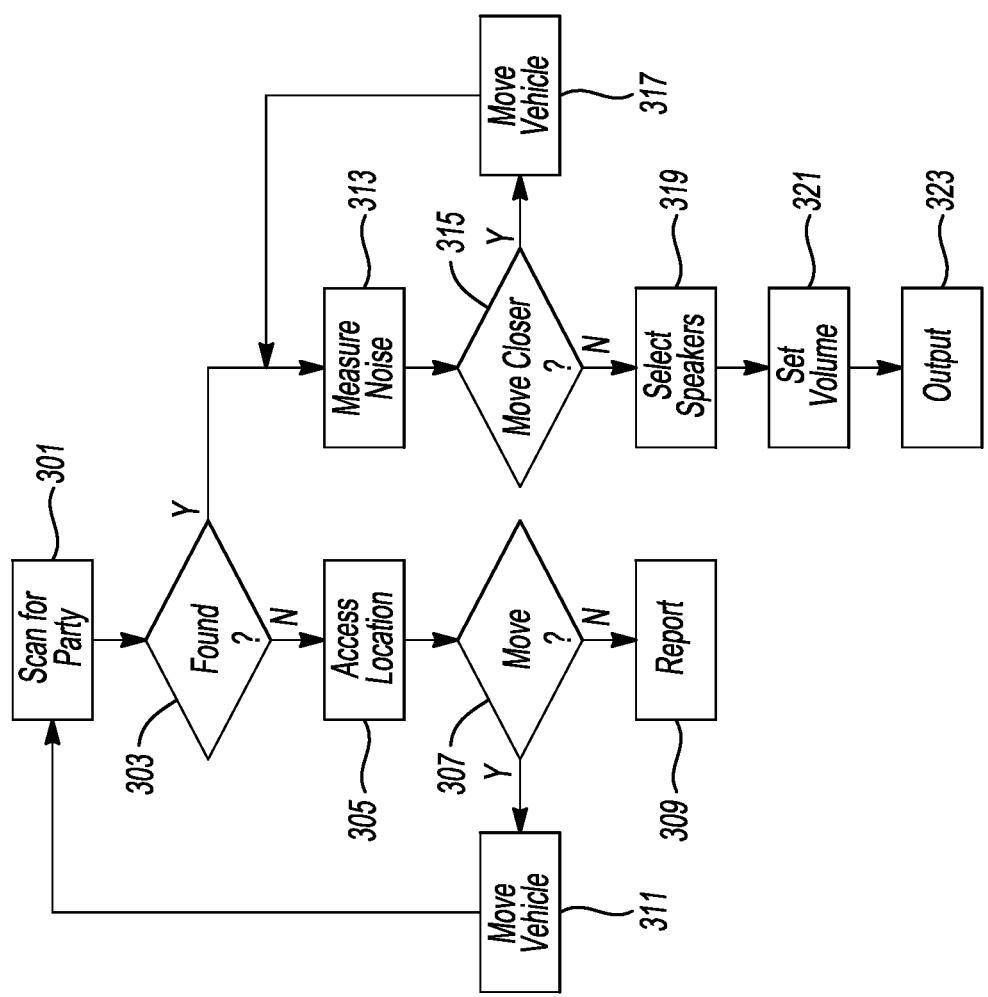
FIG. 3 shows an illustrative example of a sound control process.

FIG. 3 shows an illustrative example of a sound control process. In this example, the vehicle 100 scans for a location of a message recipient at 301. If the recipient, or at least one recipient, is not found at 303, the vehicle 100 may access a record of personnel locations at 305. This can include an onboard record or a remote record, as necessary.

The vehicle 100 may also decide if it should move at 307. For example, if there are two recipients and one is found, the record may indicate that the other recipient should also be nearby the current vehicle location. The vehicle can determine how close it needs to remain to the found recipient and move within earshot of the found recipient to attempt to find the other recipient. If the other recipient is not found, or is projected to be out of earshot of the found recipient, the vehicle can deliver the message serially or indicate that a different vehicle should be used to deliver the message to the other recipient at 309. Otherwise, the vehicle 100 may move at 311 to reach the missing recipient (or a missing recipient if none are found).

Once any or all reachable recipients are found at 303, which can include visual identification, radio ID identification, etc., the vehicle 100 can measure ambient noise at 313 and otherwise evaluate needs for sound output. Other evaluation can include, for example, accessing camera images to determine if the recipient is wearing ear protection or operating loud equipment. In some instances, the radio signal may be detected, but the personnel may not be seen, indicating the recipient is below grade, well above grade, indoors, etc. Any of these and similar predicates may be the basis at 315 for the vehicle 100 to move closer to the intended recipient at 317.

Once the vehicle is within earshot, which may include being within maximum earshot (e.g., closer than minimally necessary) to prevent excessive sound output, the vehicle may select one or more audible outputs at 319. For example, a vehicle may be able to audibly project sound 200 feet in minimal noise conditions. But, while the intended recipient may be 200 feet away, there may be other personnel between the vehicle and recipient. To prevent excessive sound to the non-recipient interposed personnel, the vehicle 100 may move until it has a clear line of sight to the recipient without intervening parties. A vehicle may also move to orient speakers more directly towards the recipient if desired, which may be useful if the vehicle only includes directional speakers in certain directions.

The vehicle 100 may set the volume for the speakers at 321, which can include accommodation of distances, ambient noise, ear protection, etc. Multiple vehicles may also broadcast from different directions towards a single recipient, and each vehicle can diminish its volume accordingly. The vehicle may attempt to provide sufficient audio for audible comprehension, while minimizing or mitigating addition to ambient noise at the site. Types of speakers and whether they are internal or external may also be accommodated by this process. The vehicle 100 may then output the message at the set volume through the selected speakers at 323.

Figure 4:
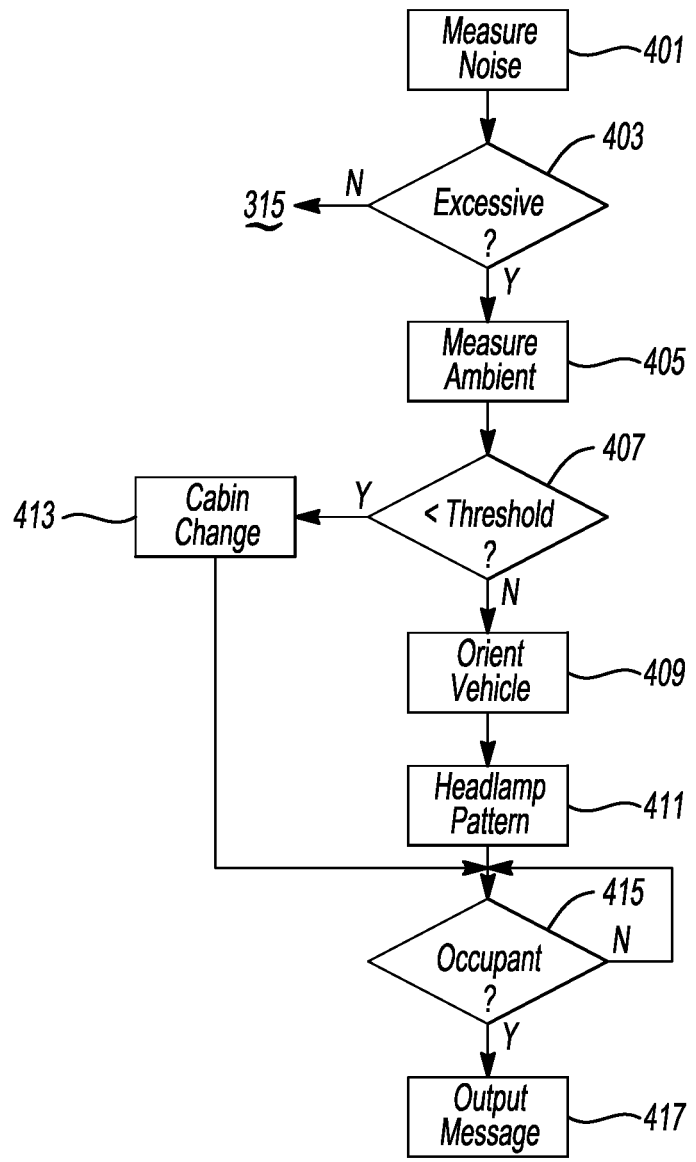
FIG. 4 shows an illustrative example of an alternative alert process.

FIG. 4 shows an illustrative example of an alternative alert process. This is a process that can be utilized to notify workers of a pending audible alert, at times when, for example, ambient noise conditions, heavy ear protection or use of heavy equipment may prohibit audible recognition of an output alert.

The process may measure ambient noise (or determine other predicates for visual alert, as mentioned above) at 313/401 and conclude that an audible alert may likely be unsuccessful under present conditions due to excessive interference at 403. If the interference is not excessive, the process can proceed to step 315 in the example shown in FIG. 3.

If the interference is deemed to be excessive at 403, the process will attempt to provide an alternative notification, which can encourage workers to, for example, reduce ambient noise, enter a vehicle cabin, remove ear protection temporarily, etc. The process can use vehicle interior or exterior lighting, in this example, to provide indication of a pending alert. Interior lighting may be visible from multiple directions, but may require low ambient light to be visible. Exterior lighting may be more focused, but may require alignment of the vehicle to be visible. A vehicle can also be provided with, for example, a flashing 360 degree light for such signaling purposes, but in this example the vehicle does not include such a light, and just has headlamps and color-changeable interior lighting.

The vehicle measures ambient light at 405, and the correct level of usable ambient light may also depend on proximity to recipients—recipients further away may require less ambient light to view interior lighting or interior lighting colors. If a vehicle has a flashing light visible under all conditions in 360 degree view, it may skip to using the visual notification without considering the light levels.

When the ambient light is too high at 407 and above a relevant threshold, the process may orient the vehicle at 409 so that bright lights (e.g. headlamps) are aimed in a direction of an intended message recipient. This may require multiple serial attempts, if two recipients are designated to be served by one vehicle, but the recipients are standing apart. A change to cabin interior lighting, when possible, can notify parties in 360 degrees.

When the vehicle is correctly oriented, the headlamps can flash a pattern at 411. This can include, for example, high beams, flashing lights, colored lights (when possible) or even projection of a message on a viewable surface if the correct headlamps (e.g., LED or Laser) are present. When the ambient light conditions are low, the process can change a cabin interior light at 413 to notify proximate recipients of a pending message.

Cabin light changes can also include flashing lights or color changes. Different patterns or colors may be used to designate recipients and/or requested actions. For example, flashing green lights could mean "stop using loud equipment," flashing blue could mean "remove ear protection when reasonable," flashing purple could mean "please enter vehicle for a message." Similarly, various colors could be used to designate recipients, although the distinction may be limited in some regards to, for example, a group vs. a foreman, unless enough nuance in the colors was possible to have specific colors assigned to specific personnel.

Once the intended recipient has entered the vehicle at 415, or taken other suitable mitigation action, such as removing ear protection (detectable via camera) or reducing ambient noise (detectable via microphone or a camera recognizing that operation of heavy equipment has stopped), the vehicle 100 can output the audio message at 417.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
receive a message for delivery to one or more specified personnel;
determine one or more onsite vehicles to deliver the message audibly;
send the message and personnel identification of the specified personnel to the one or more onsite vehicles; and
instruct the one or more onsite vehicles to deliver the message upon detection of at least one of the specified personnel.

2. The system of claim 1, wherein the one or more processors are further configured to determine locations associated with at least one of the specified personnel and determine one of the at least one onsite vehicles to deliver the message to the at least one specified personnel based on a location of the at least one onsite vehicle being within a predefined proximity to the determined location associated with the at least one specified personnel.

3. The system of claim 1, wherein the one or more processors are further configured to determine locations associated with at least one of the specified personnel and determine one of the at least one onsite vehicles to deliver the message to the at least one specified personnel based on a location of the at least one onsite vehicle being closer, than any other vehicles available to delivery a message, to the determined location associated with the at least one specified personnel.

4. The system of claim 3, wherein the one or more processors are configured to determine the locations based on data reported from at least one onsite vehicle indicating a last-detected location of at least one of the specified personnel.

5. The system of claim 3, wherein the one or more processors are configured to determine the locations based on site areas to which the specified personnel have been assigned to work.

6. A vehicle comprising:
one or more processors configured to:
receive a message for audible output and designation of a specified recipient;
use one or more vehicle sensors to detect a location of the specified recipient;
determine an audible output level projected to be sufficient for the recipient to hear the message at the location, responsive to detecting the location; and
output the message through speakers of the vehicle at the determined audible output level.

7. The vehicle of claim 6, wherein the sensors include at least one of a camera, LIDAR or RADAR.

8. The vehicle of claim 6, wherein the sensors include a receiver or transceiver capable of detecting a wireless signature associated with the specified recipient.

9. The vehicle of claim 8, wherein the wireless signature is emitted by a badge worn by the specified recipient or the wireless signature is emitted by a mobile device carried by the specified recipient.

10. The vehicle of claim 6, wherein the audible output level is determined based on a distance to the specified recipient determined by the vehicle.

11. The vehicle of claim 6, wherein the audible output level is determined based at least in part on ambient noise.

12. The vehicle of claim 11, wherein the audible output level is determined based at least in part on whether the specified recipient is wearing ear protection, as indicated by an image of the specified recipient captured by a camera of the vehicle.

13. The vehicle of claim 6, wherein the audible output level is determined based at least in part on whether vehicle external or internal speakers are being used to output the message.

14. The vehicle of claim 6, wherein the one or more processors are further configured to navigate the vehicle to a predicted location of the specified recipient, responsive to not detecting the location, and to repeat attempts at the detection of location, determination of audible output level and output of the message following the navigation.

15. A vehicle comprising:
one or more processors configured to:
receive a message for audible output and designation of a specified recipient;
use one or more vehicle sensors to detect a location of the specified recipient;
determine whether an audible output from speakers of the vehicle will be sufficient for the recipient to hear the message at the location; and
responsive to the audible output being insufficient, take at least one vehicle action, based on a determined basis for the audible output being insufficient, to mitigate the insufficiency of the audible output.

16. The vehicle of claim 15, wherein the determined basis include excessive ambient noise and wherein the at least one action includes the one or more processors being configured to navigate the vehicle closer to the location until the audible output is determined to be sufficient for the recipient to hear the message at the location in light of the ambient noise.

17. The vehicle of claim 15, wherein the determined basis include observation of the recipient, through a vehicle camera, as wearing ear protection and wherein the at least one action includes the one or more processors being configured to navigate the vehicle closer to the location until the audible output is determined to be sufficient for the recipient to hear the message at the location in light of ear protection.

18. The vehicle of claim 15, wherein the determined basis include observation of the recipient, through a vehicle camera, as wearing ear protection and wherein the at least one action includes the one or more processors being configured to delay the audible output until the vehicle camera provides an image indicating the ear protection has been removed.

19. The vehicle of claim 15, wherein the determined basis include observation of the recipient, through a vehicle camera, as operating equipment predefined as equipment that will interfere with audible message reception, and wherein the at least one action includes the one or more processors being configured to delay the audible output until the vehicle camera provides an image indicating the operation of the equipment has been ceased.

20. The vehicle of claim 15, wherein the determined basis include the speaker being aimed insufficiently towards the recipient and wherein the at least one action includes the one or more processors being configured to navigate the vehicle to align the speaker with the recipient.

\* \* \* \* \*